US012697940B2

(12) United States Patent
Soma et al.

(10) Patent No.: US 12,697,940 B2
(45) Date of Patent: Aug. 4, 2026

(54) WIPER CONTROL DEVICE

(71) Applicant: DENSO ELECTRONICS CORPORATION, Anjo-city (JP)

(72) Inventors: Taiki Soma, Anjo-city (JP); Yasuo Naruse, Anjo-city (JP); Manabu Morita, Anjo-city (JP); Tomokatsu Fuseya, Anjo-city (JP); Mitsuyoshi Tomida, Kariya-city (JP)

(73) Assignee: DENSO ELECTRONICS CORPORATION, Anjo-city (JP)

( * ) Notice: Subject to any disclaimer, the term of this patent is extended or adjusted under 35 U.S.C. 154(b) by 71 days.

(21) Appl. No.: 18/798,895

(22) Filed: Aug. 9, 2024

(65) Prior Publication Data

US 2025/0074361 A1    Mar. 6, 2025

(30) Foreign Application Priority Data

Aug. 30, 2023    (JP) ................................. 2023-140343
Mar. 7, 2024    (JP) ................................. 2024-035011

(51) Int. Cl.
B60S 1/08        (2006.01)
(52) U.S. Cl.
CPC .................................. B60S 1/0807 (2013.01)
(58) Field of Classification Search
CPC .................................................. B60S 1/0807
See application file for complete search history.

(56) References Cited

U.S. PATENT DOCUMENTS 5,485,049 A    1/1996    Shannon et al.
5,594,290 A    1/1997    Shannon et al.

| | | | | |
|---|---|---|---|---|
| 7,166,979 B2 * | 1/2007 | Zimmer | .................... | B60S 1/08 |
| | | | | 318/443 |
| 10,199,925 B2 * | 2/2019 | Watanabe | ............. | H02M 3/156 |
| 10,864,894 B2 * | 12/2020 | Utsumi | ..................... | B60S 1/08 |
| 10,965,228 B2 * | 3/2021 | Miyako | ................. | H02P 29/024 |
| 11,916,439 B2 * | 2/2024 | Ohori | .................... | H02K 21/16 |
| 2018/0145581 A1 | 5/2018 | Watanabe | | |
| 2025/0074361 A1 * | 3/2025 | Soma | ........................ | B60S 1/08 |
| 2025/0074362 A1 * | 3/2025 | Soma | ........................ | B60S 1/08 |
| 2025/0326375 A1 * | 10/2025 | Soma | ................... | B60S 1/0807 |

FOREIGN PATENT DOCUMENTS

| | | |
|---|---|---|
| JP | H10-503640 A | 3/1998 |
| JP | H10-105246 A | 4/1998 |
| JP | 2007-237921 A | 9/2007 |
| JP | 2018-085857 A | 5/2018 |
| JP | 2019-043158 A | 3/2019 |

OTHER PUBLICATIONS

U.S. Appl. No. 18/798,913, filed Aug. 9, 2024, Soma et al.

* cited by examiner

*Primary Examiner* — Michael A Berns

(74) *Attorney, Agent, or Firm* — Harness, Dickey & Pierce, P.L.C.

(57)        ABSTRACT

A wiper control device includes an acquisition unit and an estimation unit. The estimation unit is configured to acquire a value related to a current flowing through a wiper motor that drives a wiper configured to reciprocate between a first position and a second position. The estimation unit is configured to estimate a wiper angle, which is a rotation angle of the wiper, based on a current ripple in the current flowing through the wiper motor. The current ripple has a periodicity corresponding to driving of the wiper motor.

18 Claims, 9 Drawing Sheets

WIPER CONTROL DEVICE

CROSS REFERENCE TO RELATED APPLICATIONS

The present application claims the benefit of priority from Japanese Patent Application No. 2023-140343 filed on Aug. 30, 2023 and Japanese Patent Application No. 2024-035011 filed on Mar. 7, 2024. The entire disclosures of the above applications are incorporated herein by reference.

TECHNICAL FIELD

The present disclosure relates to a wiper control device.

BACKGROUND

There has been known a wiper device that calculates a position of a wiper blade from a reference position based on a rotation speed of a rotor of a wiper motor detected by a Hall sensor and a speed reduction ratio of a speed reduction mechanism of the wiper motor.

SUMMARY

A wiper control device according to an aspect of the present disclosure includes an acquisition unit and an estimation unit. The acquisition unit is configured to acquire a value related to a current flowing through a wiper motor that drives a wiper configured to reciprocate between a first position and a second position. The estimation unit is configured to estimate a wiper angle, which is a rotation angle of the wiper, based on a current ripple in the current flowing through the wiper motor. The current ripple has a periodicity corresponding to driving of the wiper motor.

A wiper control device according to another aspect of the present disclosure includes a processor and a memory. The memory stores instructions configured to, when executed by the processor, cause the processor to acquire a value related to a current flowing through a wiper motor that drives a wiper configured to reciprocate between a first position and a second position, and estimate a wiper angle, which is a rotation angle of the wiper, based on a current ripple in the current flowing through the wiper motor. The current ripple has a periodicity corresponding to driving of the wiper motor.

BRIEF DESCRIPTION OF DRAWINGS

Objects, features and advantages of the present disclosure will become apparent from the following detailed description made with reference to the accompanying drawings. In the drawings:

FIG. 2 is a diagram illustrating a wiper of the wiper drive system;

FIG. 3 is a diagram illustrating a relationship between a current flowing through a wiper motor of the wiper drive system and time;

DETAILED DESCRIPTION

Figure 1:
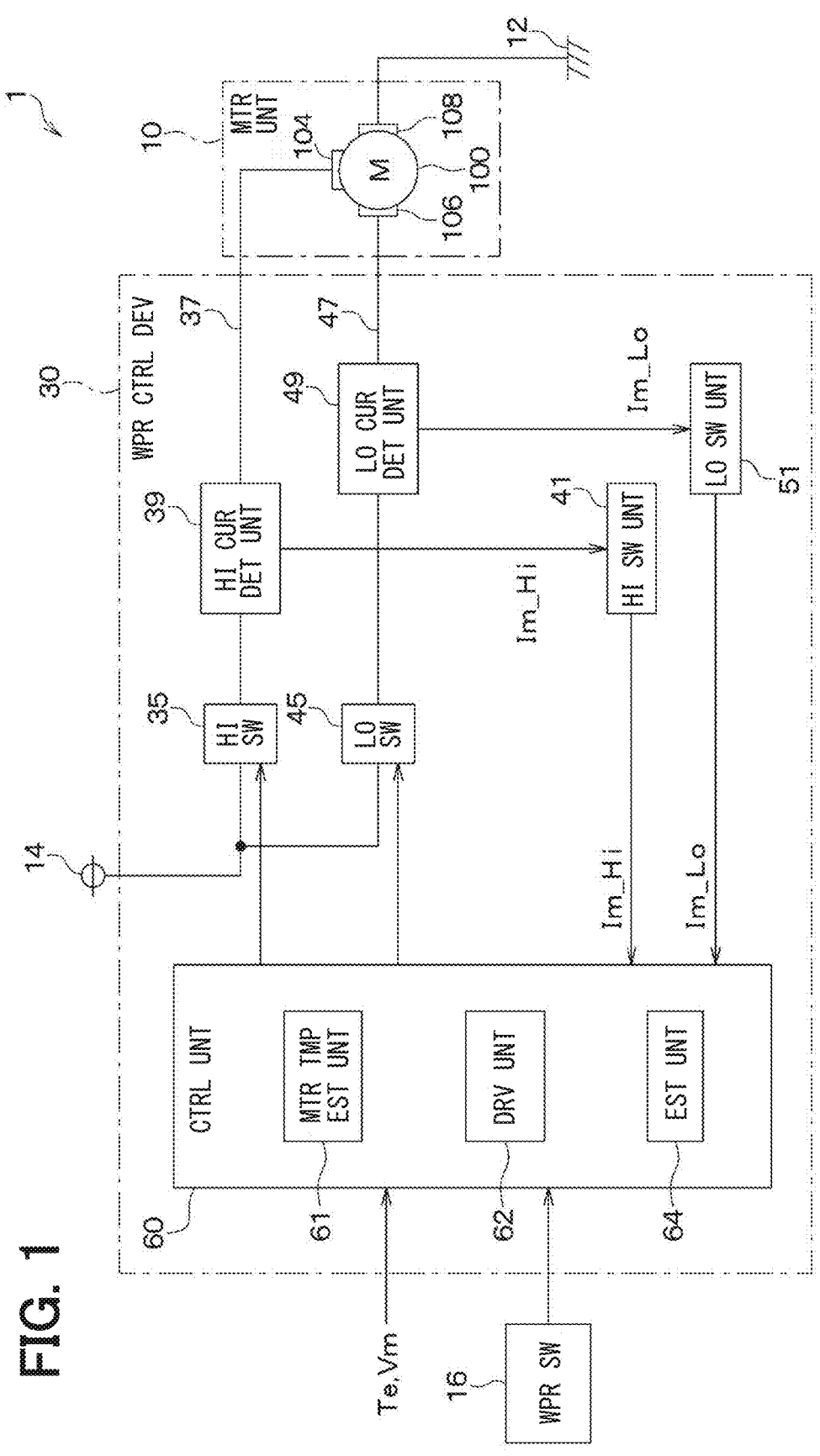
FIG. 1 is a configuration diagram of a wiper drive system including a wiper control device according to an embodiment.

A wiper device according to a comparative example calculates a position of a wiper blade from a reference position based on a rotation speed of a rotor of a wiper motor detected by a Hall sensor and a reduction ratio of a reduction mechanism of the wiper motor.

The above-described wiper device includes the Hall sensor that detects the rotation speed of the rotor. Thus, a signal wire for the Hall sensor is required, and therefore the wiper device of the comparative example is complicated and the cost of the wiper device increases.

A wiper control device according to an aspect of the present disclosure includes an acquisition unit and an estimation unit. The acquisition unit is configured to acquire a value related to a current flowing through a wiper motor that drives a wiper configured to reciprocate between a first position and a second position. The estimation unit is configured to estimate a wiper angle, which is a rotation angle of the wiper, based on a current ripple in the current flowing through the wiper motor. The current ripple has a periodicity corresponding to driving of the wiper motor.

A wiper control device according to another aspect of the present disclosure includes a processor and a memory. The memory stores instructions configured to, when executed by the processor, cause the processor to acquire a value related to a current flowing through a wiper motor that drives a wiper configured to reciprocate between a first position and a second position, and estimate a wiper angle, which is a rotation angle of the wiper, based on a current ripple in the current flowing through the wiper motor. The current ripple has a periodicity corresponding to driving of the wiper motor.

In each of the above-described wiper control devices, the wiper angle is estimated without providing a Hall sensor for detecting a rotation speed of the rotor. Thus, it is not necessary to provide a signal wire for the Hall sensor. Therefore, the wiper angle can be estimated with a simple configuration.

Hereinafter, embodiments will be described with reference to the drawings. In the following embodiments, the same or equivalent portions are denoted by the same reference numerals, and the description thereof will be omitted.

A wiper control device according to an embodiment can estimate a rotation angle of a wiper with a simple configuration. The wiper control device can be adopted, for example, to a wiper drive system for a vehicle. First, a wiper drive system 1 will be described.

As illustrated in FIG. 1, the wiper drive system 1 includes a motor unit (MTR UNT) 10, a motor ground 12, a motor power supply 14, a wiper switch (WPR SW) 16, and a wiper control device (WPR CTRL DEV) 30.

The motor unit 10 includes a wiper motor (M) 100. The wiper motor 100 includes a high terminal 104, a low terminal 106, and a ground terminal 108. The high terminal 104 and the low terminal 106 are connected to the wiper control device 30. The ground terminal 108 is connected to the motor ground 12. The wiper motor 100 rotates at a relatively high speed by energization to the high terminal 104. When the low terminal 106 is energized, the wiper motor 100 rotates at a lower speed than when the high terminal 104 is energized. A wiper 90 of a vehicle as illustrated in FIG. 2 is operated by the rotation of the wiper motor 100 and a link mechanism (not shown) connected to the wiper motor 100.

The rotation of the wiper motor 100 causes the wiper 90 to reciprocate between a lower return position Pd and an upper return position Pu on a windshield (not shown). At this time, the wiper motor 100 repeats contact and non-contact between brushes and a plurality of commutator segments in a commutator of the wiper motor 100. As a result, the wiper motor 100 has a characteristic in which, as illustrated in FIG. 3, a current ripple Ir that varies with periodicity corresponding to driving of the wiper motor 100 is generated in a current flowing through the wiper motor 100. The amplitude of the current ripple Ir is set to, for example, 1 to 2 A. When the wiper switch 16 is turned off, the rotation of the wiper motor 100 is stopped so that the wiper 90 stops at the lower return position Pd.

Figures 2, 3:
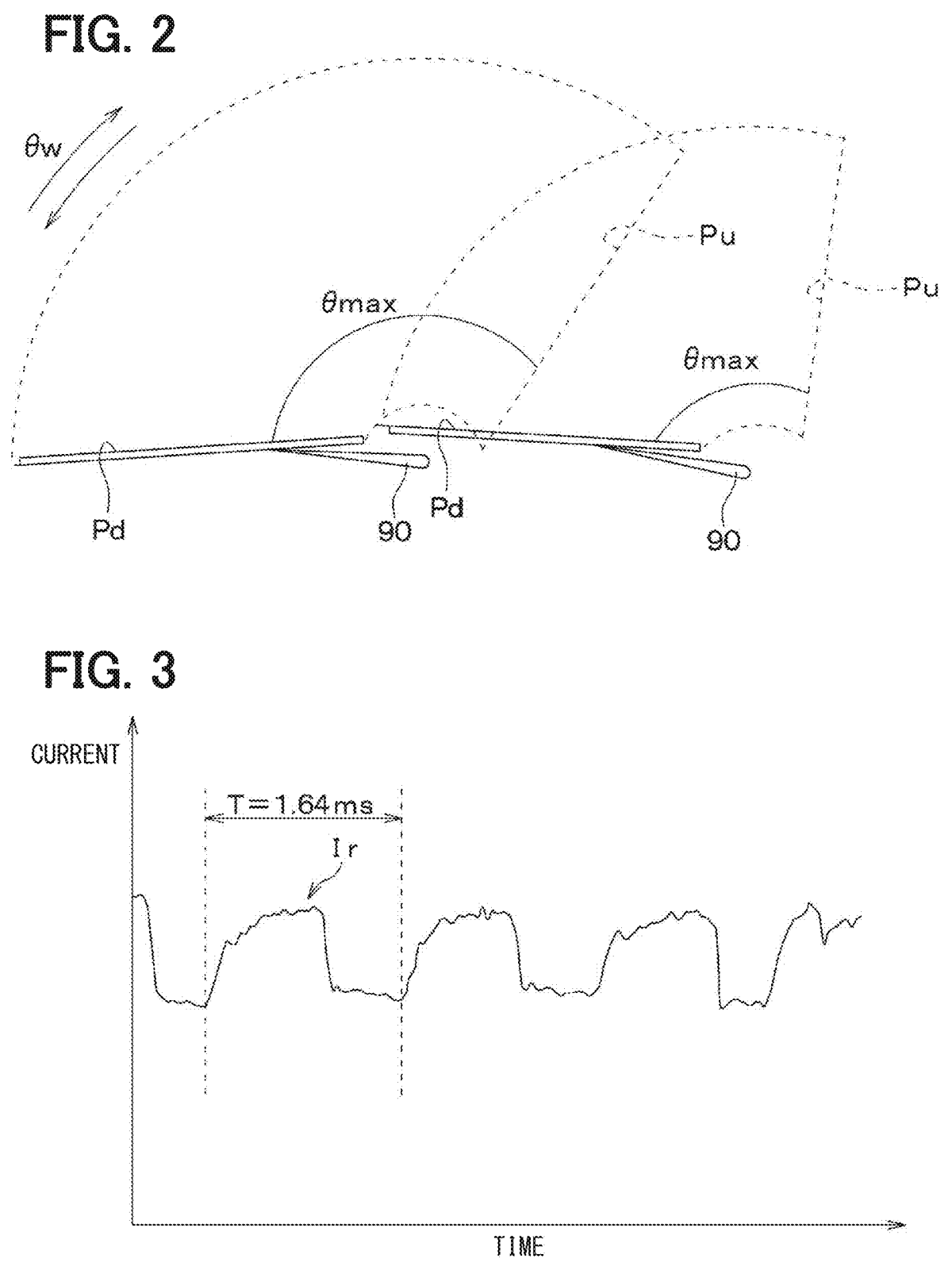

As illustrated in FIG. 2, the rotation angle of the wiper 90 when reciprocating between the lower return position Pd and the upper return position Pu is defined as a wiper angle $\theta w$. An angle from the lower return position Pd to the upper return position Pu is defined as a maximum angle $\theta max$. The maximum angle $\theta max$ is, for example, 140 degrees. A value of the wiper angle $\theta w$ is in a range of zero to $2 \times \theta max$. When the wiper angle $\theta w$ is zero or $2 \times \theta max$, the wiper position Pw is the lower return position Pd. When the wiper angle $\theta w$ is $\theta max$, the wiper position Pw is the upper return position Pu. Furthermore, when $0 < \theta w < \theta max$, the wiper 90 rotates from the lower return position Pd toward the upper return position Pu. When $\theta max < \theta w < 2 \times \theta max$, the wiper 90 rotates from the upper return position Pu toward the lower return position Pd.

Returning to FIG. 1, the motor power supply 14 is a secondary battery such as a lithium ion battery, a nickel hydride battery, or a lead storage battery. A voltage of the motor power supply 14 is, for example, 12 V.

The wiper switch 16 is operated by an operator, and outputs a signal to a control unit (CTRL UNT) 60 of the wiper control device 30. The signal is for setting an operation state of the wiper 90 to any one of a continuous high speed mode, a continuous low speed mode, an intermittent mode, and a stop.

The wiper control device 30 controls the wiper motor 100 by controlling a voltage applied to the wiper motor 100. Thus, the wiper control device 30 controls driving of the wiper 90 connected to the wiper motor 100. Specifically, the wiper control device 30 includes a high switch (HI SW) 35, a high wire 37, a high current detection unit (HI CUR DET UNT) 39, a high switching unit (HI SW UNT) 41, a low switch (LO SW) 45, a low wire 47, a low current detection unit (LO CUR DET UNT) 49, a low switching unit (LO SW UNT) 51, and the control unit 60.

The high switch 35 includes a relay, a transistor, or the like. One end of the high switch 35 is connected to the motor power supply 14. The other end of the high switch 35 is connected to the high terminal 104 via the high wire 37. The high switch 35 corresponds to a drive element and is turned on and off by a signal from the control unit 60. As a result, the high terminal 104 is energized or interrupted.

The high current detection unit 39 includes a shunt resistor, a current mirror circuit, a Hall IC, or the like. The high current detection unit 39 detects a high current Im_Hi. Furthermore, the high current detection unit 39 outputs a signal corresponding to the detected high current Im_Hi to the control unit 60 via the high switching unit 41. The high current Im_Hi is a current flowing from the motor power supply 14 to the high terminal 104 via the high switch 35 and the high wire 37.

Figure 4A:
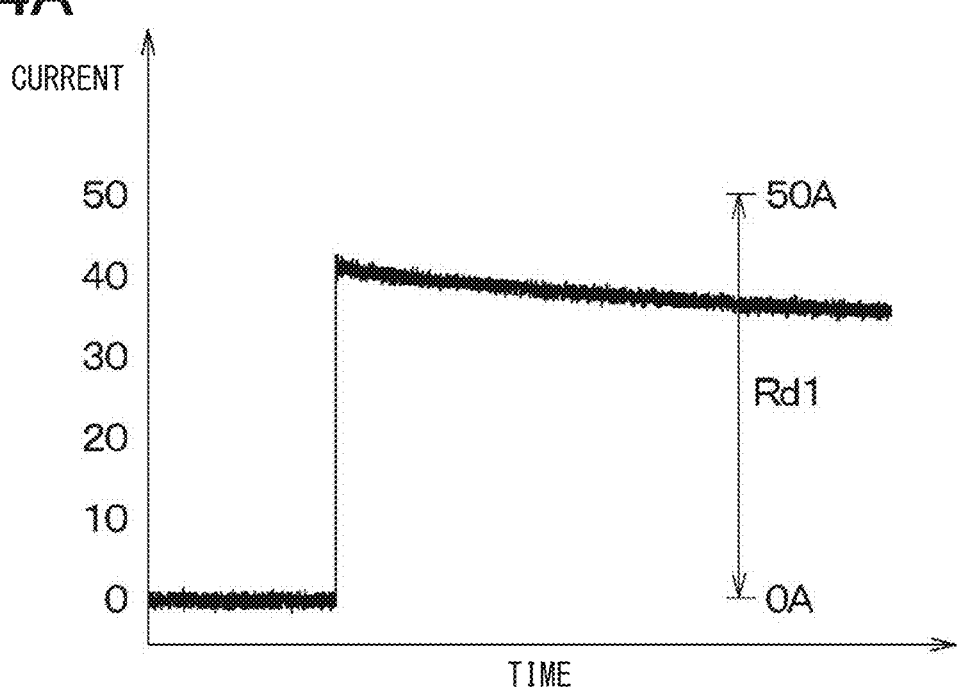
FIG. 4A is a diagram illustrating a first detection range of the wiper control device.
Figure 4B:
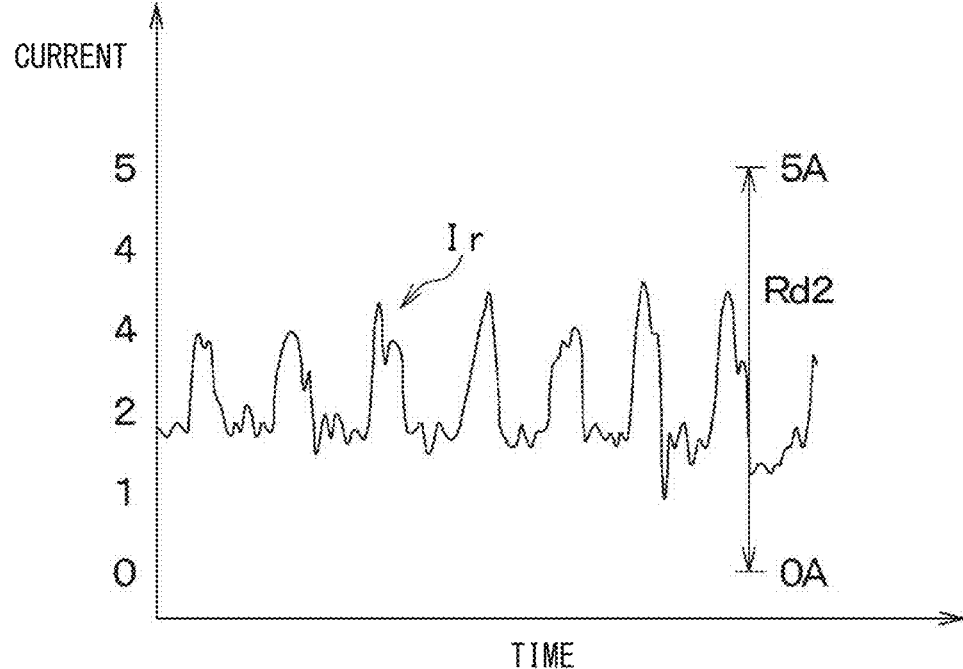
FIG. 4B is a diagram illustrating a second detection range of the wiper control device.

The high switching unit 41 switches a high current detection range. For example, the high switching unit 41 includes a switching element such as a transistor. The high switching unit 41 switches an electrical resistance or the like of the high current detection unit 39 by turning on and off the switching element. Accordingly, the high switching unit 41 switches the high current detection range between a first high detection range and a second high detection range. The high current detection range is a detection range of a current detected by the high current detection unit 39. The first high detection range is, for example, 0 to 50 A as illustrated in FIG. 4A. The second high detection range is a detection range that is smaller than the first high detection range, and is, for example, 0 to 5 A as illustrated in FIG. 4B. In FIG. 4A, the first high detection range is indicated as Rd1. In FIG. 4B, the second high detection range is indicated as Rd2. Since the second high detection range is smaller than the first high detection range, the resolution for the current detected in the second high detection range is higher than the resolution for the current detected in the first high detection range.

The high switching unit 41 switches the high current detection range between the first high detection range and the second high detection range based on the high current Im_Hi. Specifically, when the high current Im_Hi is equal to or greater than a high protection threshold Im_Hi_th, the high switching unit 41 sets the high current detection range to the first high detection range. This allows the high current detection unit 39 to detect a relatively large high current Im_Hi. Therefore, it is possible to detect abnormal heating of the high wire 37, the wiper motor 100, and the wiper 90 due to the relatively large high current Im_Hi.

On the other hand, when the high current Im_Hi is less than the high protection threshold Im_Hi_th, the high switching unit 41 sets the high current detection range to the second high detection range. As a result, when the high current Im_Hi is less than the high protection threshold Im_Hi_th, the high current detection unit 39 can detect the high current Im_Hi with high accuracy. This makes it easy to detect the current ripple Ir included in the high current Im_Hi. The high protection threshold Im_Hi_th is set by experiment, simulation, or the like so as to achieve both protection of the high wire 37, the wiper motor 100, and the wiper 90 and current detection accuracy.

Returning to FIG. 1, the low switch 45 includes a relay, a transistor, or the like. One end of the low switch 45 is connected to the motor power supply 14. The other end of the low switch 45 is connected to the low terminal 106 via the low wire 47. The low switch 45 corresponds to a drive element, and is turned on and off by a signal from the control unit 60. As a result, the low terminal 106 is energized or interrupted.

The low current detection unit 49 includes a shunt resistor, a current mirror circuit, a Hall IC, or the like. The low current detection unit 49 detects the low current Im_Lo. Furthermore, the low current detection unit 49 outputs a signal corresponding to the detected low current Im_Lo to the control unit 60 via the low switching unit 51. The low current Im_Lo is a current flowing from the motor power supply 14 to the low terminal 106 via the low switch 45 and the low wire 47.

The low switching unit 51 switches a low current detection range. For example, the low switching unit 51 includes a switching element such as a transistor. The low switching unit 51 switches an electrical resistance or the like of the low current detection unit 49 by turning on and off the switching element. Accordingly, the low switching unit 51 switches the low current detection range between a first low detection range and a second low detection range. The low current detection range is a detection range of a current detected by the low current detection unit 49. The first low detection range is, for example, 0 to 50 A. The second low detection range is a detection range that is smaller than the first low detection range, and is, for example, 0 to 5 A. Since the second low detection range is smaller than the first low detection range, the resolution for the current detected in the second low detection range is higher than the resolution for the current detected in the first low detection range.

The low switching unit 51 switches the low current detection range between the first low detection range and the second low detection range based on the low current Im_Lo. Specifically, when the low current Im_Lo is equal to or greater than the low protection threshold Im_Lo_th, the low switching unit 51 sets the low current detection range to the low first detection range. This allows the low current detection unit 49 to detect a relatively large low current Im_Lo. Therefore, abnormal heating of the low wire 47, the wiper motor 100, and the wiper 90 due to a relatively large low current Im_Lo can be detected.

Furthermore, when the low current Im_Lo is less than the low protection threshold Im_Lo_th, the low switching unit 51 sets the low current detection range to the low second detection range. As a result, when the low current Im_Lo is less than the low protection threshold Im_Lo_th, the low current detection unit 49 can detect the low current Im_Lo with high accuracy. This makes it easy to detect the current ripple Ir contained in the low current Im_Lo. The low protection threshold value Im_Lo_th is set by experiment, simulation, or the like so as to achieve both protection of the low wire 47, the wiper motor 100, and the wiper 90 and current detection accuracy.

The control unit 60 is mainly composed of a microcomputer and includes a central processing unit (CPU), a read only memory (ROM), a flash memory, a random access memory (RAM), an input/output (I/O), a drive circuit, an analog-to-digital (A/D) converter, a comparator circuit, a direct current-to-direct current (DCDC) converter, a low-pass filter, and bus lines connecting these components. The control unit 60 is driven by a voltage from the motor power supply 14 or a power supply (not shown). Furthermore, the control unit 60 has a motor temperature estimation unit (MTR TMP EST UNT) 61, a drive unit (DRV UNT) 62, and an estimation unit (EST UNT) 64 as functional blocks.

The motor temperature estimation unit 61 estimates the temperature of the wiper motor 100 by executing a program (that is, instructions) stored in the control unit 60. For example, the motor temperature estimation unit 61 acquires the high current Im_Hi from the high current detection unit 39 via the high switching unit 41. In addition, the motor temperature estimation unit 61 acquires the low current Im_Lo from the low current detection unit 49 via the low switching unit 51. Furthermore, the motor temperature estimation unit 61 acquires an environmental temperature Te by communicating with a detection device (not shown). Furthermore, the motor temperature estimation unit 61 acquires a motor voltage Vm via wire or the like (not shown). A device such as a thermistor is adopted to detect the environmental temperature Te. The motor voltage Vm is a voltage of the wiper motor 100.

The motor temperature estimation unit 61 calculates an electric power of the wiper motor 100 from the high current Im_Hi or the low current Im_Lo and the motor voltage Vm. Furthermore, the motor temperature estimation unit 61 estimates a temperature of the wiper motor 100 using the calculated electric power, the acquired environmental temperature Te, and a map. The motor temperature estimation unit 61 outputs a signal corresponding to the estimated temperature of the wiper motor 100 to the estimation unit 64. When the environmental temperature Te is fixed, the amount of heat generated by the wiper motor 100 increases with increase in the electric power of the wiper motor 100. Therefore, the map for estimating the temperature of the wiper motor 100 is set so that, for example, the temperature of the wiper motor 100 increases with increase in the electric power. When the electric power of the wiper motor 100 is fixed, the environmental temperature Te and the temperature of the wiper motor 100 are balanced. Therefore, the map for estimating the temperature of the wiper motor 100 is set, for example, so that the temperature of the wiper motor 100 increases with increase in the environmental temperature Te.

The drive unit 62 executes a program (that is, instructions) stored in the control unit 60 to control on/off states of the high switch 35 and the low switch 45 based on signals from the wiper switch 16 and the estimation unit 64. Thus, the drive unit 62 controls the voltage applied to the wiper motor 100. Therefore, the operation state of the wiper 90 becomes any one of the continuous high speed mode, the continuous low speed mode, the intermittent mode, and the stop.

The estimation unit 64 executes a program (that is, instructions) stored in the control unit 60 to estimate the wiper angle θw based on the signal from the wiper switch 16, the temperature of the wiper motor 100, the high current Im_Hi, and the low current Im_Lo. The estimation unit 64 outputs a signal corresponding to the estimated wiper angle θw to the drive unit 62.

Figure 5:
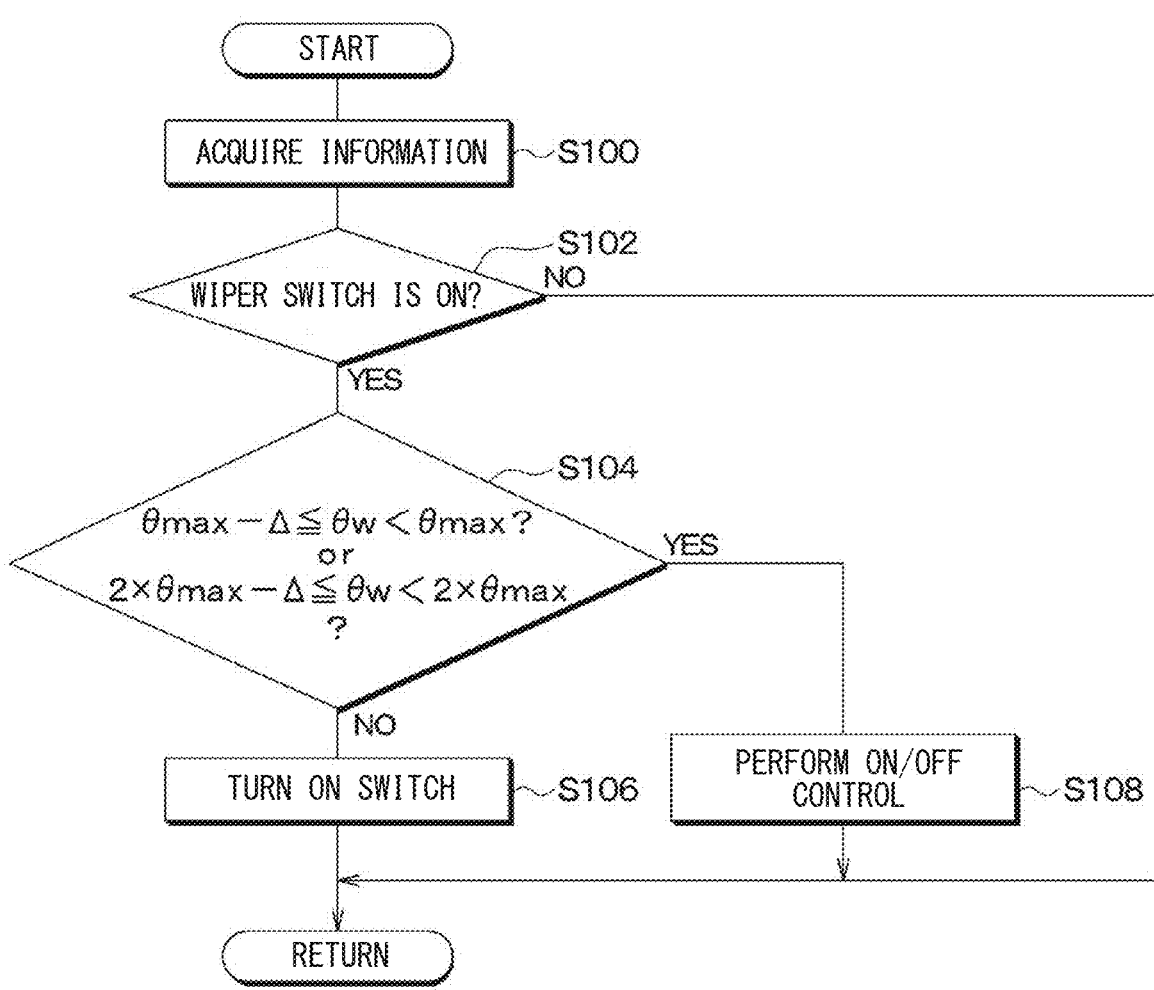
FIG. 5 is a flowchart illustrating processes executed by a drive unit in the wiper control device.

The wiper drive system 1 is configured as described above. Next, control of the voltage applied to the wiper motor 100 by execution of the program stored in the control unit 60 by the drive unit 62 will be described with reference to the flowchart of FIG. 5. The program stored in the control unit 60 is executed, for example, when the ignition or power supply of the vehicle (not shown) is turned on.

In S100, the drive unit 62 acquires various types of information. More specifically, the drive unit 62 acquires a signal for setting the operation state of the wiper 90 to the continuous high speed mode, the continuous low speed mode, or the intermittent mode from the wiper switch 16. In addition, the drive unit 62 acquires the wiper angle θw from the estimation unit 64.

Subsequently, in S102, the drive unit 62 determines whether the wiper switch 16 is ON based on the signal from the wiper switch 16 acquired in S100. The drive unit 62 determines that the wiper switch 16 is turned on when the drive unit 62 acquires the signal for setting the operation state of the wiper 90 to the continuous high speed mode, the continuous low speed mode, or the intermittent mode in S100. Thereafter, the process of the drive unit 62 proceeds to S104. On the other hand, the drive unit 62 determines that the wiper switch 16 is turned off when the drive unit 62 acquires the signal for setting the operation state of the wiper 90 to the stop in S100. At this time, since the wiper 90 stops and there is no need to drive the wiper 90, the process of the drive unit 62 returns to S100.

In S104 subsequent to S102, the drive unit 62 determines whether the wiper angle θw acquired in S100 is equal to or greater than θmax−Δ and less than θmax. Accordingly, the drive unit 62 determines whether the wiper position Pw is just before the upper return position Pu. Furthermore, the drive unit 62 determines whether the wiper angle θw acquired in S100 is equal to or greater than 2×θmax−Δ and less than 2×θmax. Accordingly, the drive unit 62 determines whether the wiper position Pw is just before the lower return position Pd. Note that Δ is set by experiment, simulation, or the like so that it is possible to determine whether the wiper position Pw is just before the lower return position Pd or the upper return position Pu. "Δ" is, for example, 1 to 10 degrees.

When the wiper angle θw is less than θmax−Δ or is θmax, the wiper position Pw is not just before the upper return position Pu, so the process of the drive unit 62 proceeds to S106. When the wiper angle θw is greater than θmax and less than 2×θmax−Δ, or is 2×θmax, the wiper position Pw is not just before the lower return position Pd, so the process of the drive unit 62 proceeds to S106. When the wiper angle θw is equal to or greater than θmax−Δ and less than θmax, the wiper position Pw is just before the upper return position Pu, so the process of the drive unit 62 proceeds to S108. When the wiper angle θw is equal to or greater than 2×θmax−Δ and less than 2×θmax, the wiper position Pw is just before the lower return position Pd, so the process of the drive unit 62 proceeds to S108.

In S106 subsequent to S104, the drive unit 62 turns on the high switch 35 or the low switch 45. Accordingly, the wiper 90 is driven by the rotation of the wiper motor 100.

Here, for example, it is assumed that the wiper switch 16 outputs the signal for setting the operation state of the wiper 90 to the continuous high speed mode to the drive unit 62 by the operation of the operator. At this time, the drive unit 62 turns on the high switch 35. Accordingly, a voltage is applied from the motor power supply 14 to the wiper motor 100 via the high switch 35, the high wire 37, the high current detection unit 39 and the high terminal 104. As a result, the wiper motor 100 rotates at a higher speed than when the low terminal 106 is energized. Therefore, the wiper 90 connected to the wiper motor 100 rotates at a high speed, and the operation state of the wiper 90 becomes the continuous high speed mode. At this time, the low switch 45 is off.

For example, it is assumed that the wiper switch 16 outputs the signal for setting the operation state of the wiper 90 to the continuous low speed mode to the drive unit 62 by the operation of the operator. At this time, the drive unit 62 turns on the low switch 45. Accordingly, a voltage is applied from the motor power supply 14 to the wiper motor 100 via the low switch 45, the low wire 47, the low current detection unit 49 and the low terminal 106. As a result, the wiper motor 100 rotates at a lower speed than when the high terminal 104 is energized. Therefore, the wiper 90 connected to the wiper motor 100 rotates at a low speed, and the operation state of the wiper 90 becomes the continuous low speed mode. At this time, the high switch 35 is off. When the wiper 90 is in the intermittent mode, the drive unit 62 turns on the low switch 45. Accordingly, the wiper motor 100 rotates at a low speed. When the wiper 90 reciprocates between the lower return position Pd and the upper return position Pu and the wiper position Pw is at the lower return position Pd, the drive unit 62 turns off the low switch 45. Accordingly, the wiper motor 100 is temporarily stopped, so that the wiper 90 is temporarily stopped. Thereafter, the drive unit 62 turns on the low switch 45. Accordingly, the wiper motor 100 rotates at a low speed. Therefore, by these operations, the wiper 90 intermittently reciprocates between the lower return position Pd and the upper return position Pu.

In this way, after the drive unit 62 controls the high switch 35 and the low switch 45, the process of the drive unit 62 returns to S100.

In S108 subsequent to S104, the wiper position Pw is just before the lower return position Pd or the upper return position Pu. Therefore, in S108, the drive unit 62 performs PWM control on the wiper motor 100 by performing on/off control of the high switch 35 or the low switch 45. As a result, the drive unit 62 reduces the electric power supplied to the wiper motor 100. Thus, the wiper 90 is decelerated to smoothly move to the lower return position Pd or the upper return position Pu. Therefore, for example, operating noise of the wiper 90 generated when the wiper position Pw is the lower return position Pd or the upper return position Pu is reduced. PWM is an abbreviation for Pulse Width Modulation.

More specifically, when the operation state of the wiper 90 is the continuous high speed mode, the drive unit 62 repeats the operation of turning on the high switch 35 for a first high time and then turning off the high switch 35 for a second high time. When the operation state of the wiper 90 is the continuous low speed mode, the drive unit 62 repeats the operation of turning on the low switch 45 for a first low time, and then turning off the low switch 45 for a second low time. Since the electric power supplied to the wiper motor 100 is reduced by these operations, the wiper 90 is decelerated. Therefore, the wiper 90 is smoothly driven. When the wiper 90 is stopped, the wiper 90 smoothly stops at the lower return position Pd. The first high time, the second high time, the first low time, and the second low time are set by experiment, simulation, or the like so that the electric power supplied to the wiper motor 100 is reduced and the wiper 90 is smoothly driven. In addition, by gradually changing the electric power supplied to the wiper motor 100 by changing the first high time, the second high time, the first low time, and the second low time, the operation of the wiper 90 becomes smoother.

In this way, after the drive unit 62 performs the on/off control of either the high switch 35 or the low switch 45, the process of the drive unit 62 returns to S100.

As described above, the drive unit 62 controls the voltage applied to the wiper motor 100. Next, the estimation of the wiper angle θw in the estimation unit 64 by executing the program (that is, the instructions) in the control unit 60 will be described with reference to the flowchart of FIG. 6. A period of a series of operations from the start of the process of S200 of the estimation unit 64 to the return to the process of S200 is defined as a control cycle τ of the estimation unit 64.

In S200, the estimation unit 64 acquires various types of information. More specifically, the estimation unit 64 acquires the signal for setting the operation state of the wiper 90 to one of the continuous high speed mode, the continuous low speed mode, the intermittent mode, and the stop from the wiper switch 16. In addition, the estimation unit 64 acquires the temperature of the wiper motor 100 from the motor temperature estimation unit 61. Furthermore, the estimation unit 64 acquires the high current Im_Hi from the high current detection unit 39. In addition, the estimation unit 64 acquires the low current Im_Lo from the low current detection unit 49. Furthermore, the estimation unit 64 acquires the torque of the wiper motor 100 from a torque estimation device (not shown). The torque estimation device estimates the torque of the wiper motor 100 based on, for example, the state of the windshield (not shown), the vehicle speed, the electric power of the wiper motor 100, and the like.

For example, it is assumed here that the wiper 90 is in the continuous high speed mode. At this time, the high switch 35 is turned on. Accordingly, a voltage is applied from the motor power supply 14 to the wiper motor 100 via the high switch 35, the high wire 37, the high current detection unit 39 and the high terminal 104. As a result, a current flows through the wiper motor 100 to rotate the wiper motor 100, so that the high current Im_Hi includes the current ripple Ir. Therefore, the high current Im_Hi varies periodically.

For example, it is assumed that the operation state of the wiper 90 is the continuous low speed mode or the intermittent mode. At this time, the low switch 45 is turned on. Accordingly, a voltage is applied from the motor power supply 14 to the wiper motor 100 via the low switch 45, the low wire 47, the low current detection unit 49 and the low terminal 106. As a result, a current flows through the wiper motor 100 to rotate the wiper motor 100, so that the low current Im_Lo includes the current ripple Ir. Therefore, the low current Im_Lo varies periodically.

As described above, the current ripple Ir is generated due to contact and non-contact between the commutator and the brushes of the wiper motor 100. The number of times when the amount of change $\Delta$Im while the wiper 90 moves from the lower return position Pd to the upper return position Pu and from the upper return position Pu to the lower return position Pd becomes equal to or greater than the change threshold value $\Delta$Im_th is uniquely determined by the structure of the wiper motor 100. Therefore, by counting the number of times when the amount of change $\Delta$Im is equal to or greater than the change threshold value $\Delta$Im_th as the number of pulses N, it is possible to estimate the wiper angle $\theta$w.

Since the current flowing through the wiper motor 100 changes in accordance with the change in the voltage applied to the wiper motor 100, the current ripple Ir and the amount of change $\Delta$Im change. The current ripple Ir and the amount of change $\Delta$Im also change with change in the temperature of the wiper motor 100. The current ripple Ir and the amount of change $\Delta$Im also change with change in the torque of the wiper motor 100. Thus, it is preferable to change the change threshold value $\Delta$Im_th based on the voltage applied to the wiper motor 100, the temperature of the wiper motor 100, and the torque of the wiper motor 100.

Figure 6:
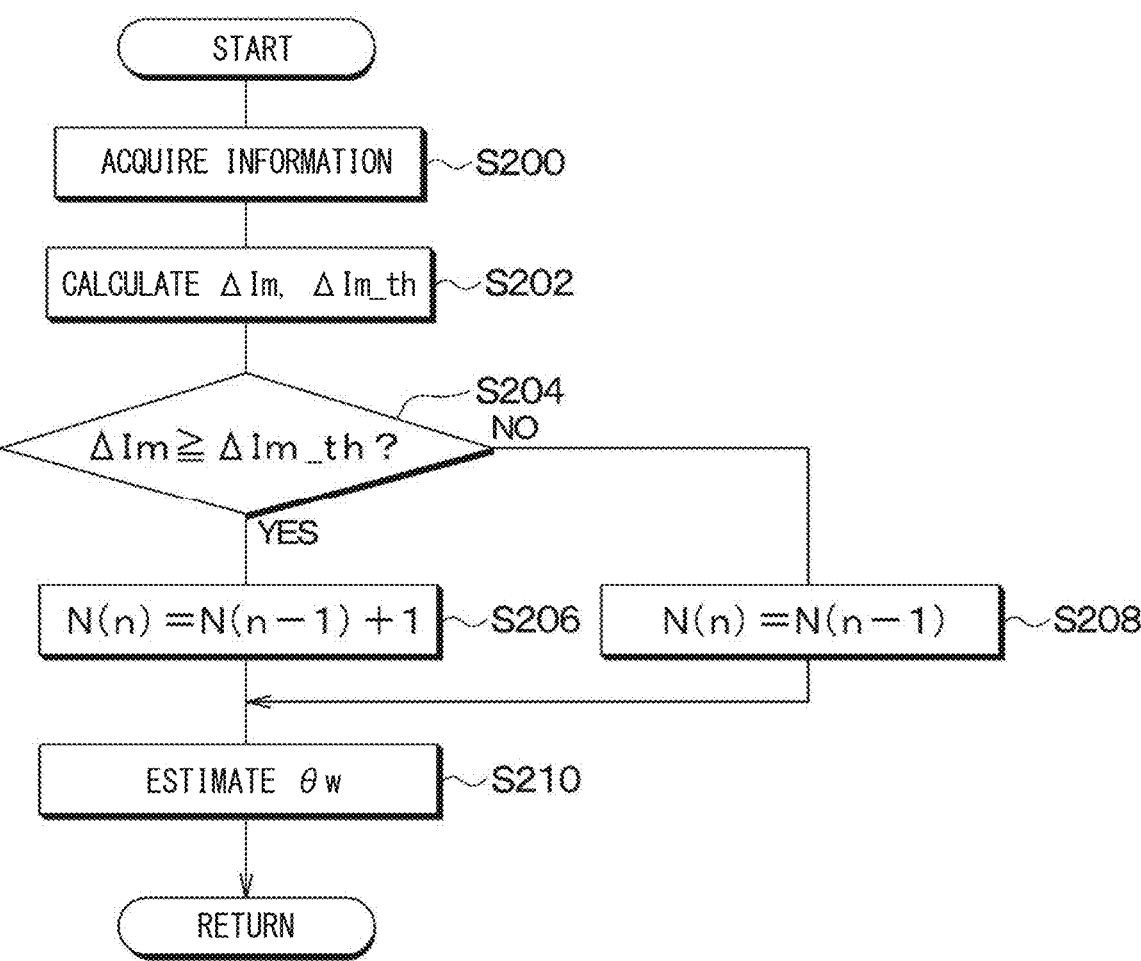
FIG. 6 is a flowchart illustrating processes executed by an estimation unit in the wiper control device.
Figure 7:
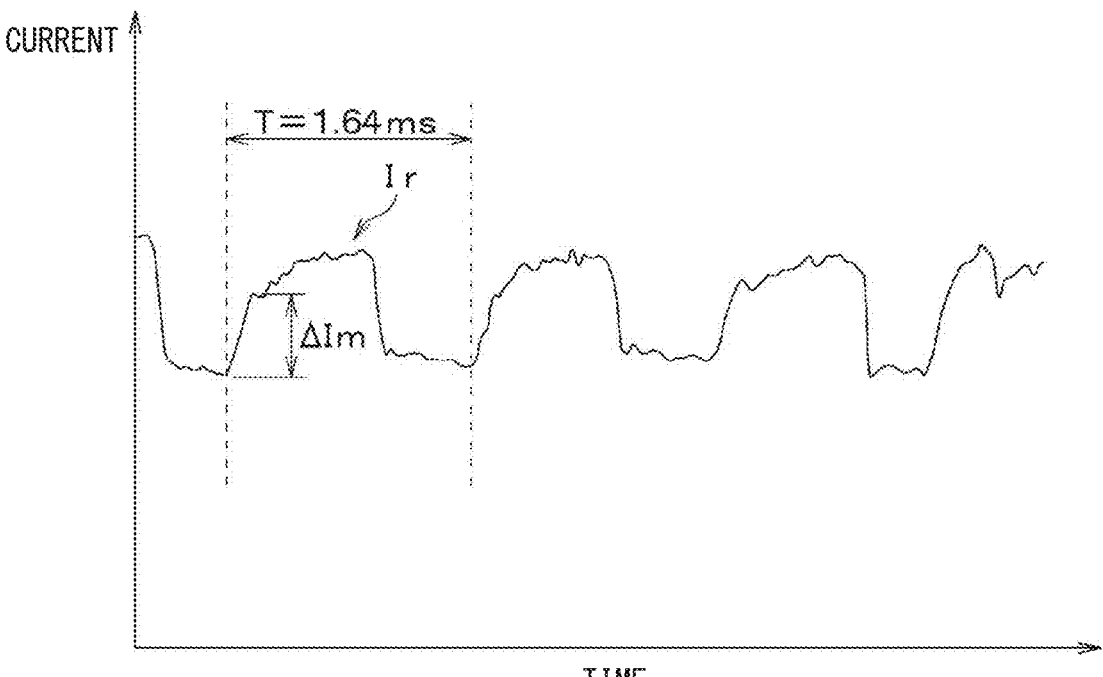
FIG. 7 is a diagram for explaining calculation of the number of pulses by the estimation unit.

Therefore, as shown in the flowchart of FIG. 6, in S202 subsequent to S200, the estimation unit 64 calculates the amount of change $\Delta$Im as shown in FIG. 7. In addition, the estimation unit 64 calculates the change threshold value $\Delta$Im_th.

For example, it is assumed that the operation state of the wiper 90 is the continuous high speed mode. In this case, the estimation unit 64 calculates the difference between the high current Im_Hi(n) in the current control cycle $\tau$(n) and the high current Im_Hi(n−1) in the last control cycle $\tau$(n−1). In this way, the estimation unit 64 calculates the amount of change $\Delta$Im. The amount of change $\Delta$Im may be the absolute value of the difference.

Also, for example, it is assumed that the operation state of the wiper 90 is the continuous low speed mode or the intermittent mode. In this case, the estimation unit 64 calculates the difference between the low current Im_Lo(n) in the current control cycle $\tau$(n) and the low current Im_Lo (n−1) in the last control cycle $\tau$(n−1). In this way, the estimation unit 64 calculates the amount of change $\Delta$Im.

Furthermore, the estimation unit 64 calculates the change threshold value $\Delta$Im_th based on the temperature of the wiper motor 100, the voltage applied to the wiper motor 100, and the torque of the wiper motor 100 acquired in S200. Specifically, the estimation unit 64 calculates the change threshold value $\Delta$Im_th using the temperature of the wiper motor 100, the voltage applied to the wiper motor 100, the torque of the wiper motor 100, and a map. The map for calculating the change threshold value $\Delta$Im_th is set, for example, so that the change threshold value $\Delta$Im_th increases with decrease in the temperature of the wiper motor 100. In addition, the map for calculating the change threshold value $\Delta$Im_th is set, for example, so that the change threshold value $\Delta$Im_th increases with increase in the voltage applied to the wiper motor 100. Furthermore, the map for calculating the change threshold value $\Delta$Im_th is set, for example, so that the change threshold value $\Delta$Im_th increases with increase in the torque of the wiper motor 100.

Returning to FIG. 6, next, in S204, the estimation unit 64 determines whether the amount of change $\Delta$Im calculated in S202 is equal to or greater than the change threshold value $\Delta$Im_th. When the amount of change $\Delta$Im is equal to or greater than the change threshold value $\Delta$Im_th, the process of the estimation unit 64 proceeds to S206. When the amount of change $\Delta$Im is less than the change threshold value $\Delta$Im_th, the process of the estimation unit 64 proceeds to S208.

In S206 subsequent to S204, the amount of change $\Delta$Im is equal to or greater than the change threshold value $\Delta$Im_th. Therefore, at this time, the estimation unit 64 calculates the number of pulses N(n) in the current control cycle $\tau$(n) by adding 1 to the number of pulses N(n−1) in the last control cycle $\tau$(n−1).

In S208 subsequent to S204, the amount of change $\Delta$Im is less than the change threshold value $\Delta$Im_th. Therefore, at this time, the estimation unit 64 sets the number of pulses N(n) in the current control cycle $\tau$(n) to the number of pulses N(n−1) in the last control cycle $\tau$(n−1).

Here, as described above, the rotation angle of the wiper motor 100 can be estimated from the number of times when the amount of change $\Delta$Im is equal to or greater than the change threshold value $\Delta$Im_th, that is, the number of pulses N, and therefore the wiper angle $\theta$w can be estimated.

Therefore, in S210, the estimation unit 64 estimates the wiper angle $\theta$w based on the calculated number of pulses N(n) in the current control cycle $\tau$(n) and a map. The estimation unit 64 also outputs a signal corresponding to the estimated wiper angle $\theta$w to the drive unit 62. Thereafter, the process of the estimation unit 64 returns to S200. The map for estimating the wiper angle $\theta$w from the number of pulses N is set based on the characteristics of the link mechanism (not shown) and the wiper motor 100, experiments, simulations, and the like. For example, it is assumed that the number of pulses N when the wiper 90 reciprocates between the lower return position Pd and the upper return position Pu is 1000 times. In this case, for example, when the number of pulses N(n) in the current control cycle $\tau$(n) is 500, the wiper angle $\theta w$ is estimated to be the maximum angle $\theta max$, and the wiper position Pw is estimated to be the upper return position Pu. In this case, for example, when the number of pulses N(n) in the current control cycle $\tau(n)$ is 1000, the wiper angle $\theta w$ is estimated to be $2 \times \theta max$, and the wiper position Pw is estimated to be the lower return position Pd. At this time, the number of pulses N may be reset.

In this manner, the estimation unit 64 estimates the wiper angle $\theta w$. Next, it will be described how the wiper control device 30 estimates the wiper angle $\theta w$ with a simple configuration.

The estimation unit 64 serves as an acquisition unit that acquires a value related to the current flowing through the wiper motor 100 in S200. In addition, in S210, the estimation unit 64 estimates the wiper angle $\theta w$ based on the current ripple Ir, which is included in the current flowing through the wiper motor 100 and has a periodicity corresponding to the driving of the wiper motor 100. The wiper motor 100 drives the wiper 90. The wiper 90 reciprocates between the lower return position Pd and the upper return position Pu. The lower return position Pd corresponds to a first position. The upper return position Pu corresponds to a second position. The wiper angle $\theta w$ is the rotation angle of the wiper 90.

Accordingly, the wiper control device 30 can estimate the wiper angle $\theta w$ without a Hall sensor for detecting the rotation speed of the rotor. Thus, it is not necessary to provide a signal wire for the Hall sensor. Therefore, the wiper angle $\theta w$ can be estimated with a simple configuration. The wiper position Pw may be estimated by a cam switch that is turned on and off according to the rotation of the wiper motor 100. On the other hand, since the wiper control device 30 of the present embodiment estimates the wiper position Pw by the above configuration, it is not necessary to provide the cam switch.

In a comparative example, a current rotation position and a rotation speed of a motor are determined based on a current ripple pulse in a motor current and a motor current polarity, which is inverted depending on a rotational direction of the motor. In contrast, the wiper control device 30 of the present embodiment estimates the wiper angle $\theta w$ based on the current ripple Ir. Therefore, the wiper control device 30 is different from the comparative example. Furthermore, the wiper control device 30 of the present embodiment has an advantageous effect of being able to estimate the wiper angle $\theta w$, which is a different effect from the comparative example.

Furthermore, the wiper control device 30 of present embodiment also provides the following effects.

The estimation unit 64 estimates the wiper angle $\theta w$ based on the number of pulses N. This makes it easier to estimate the wiper angle $\theta w$. The number of pulses N corresponds to the number of times when the absolute value of the amount of change $\Delta Im$ of the current flowing through the wiper motor 100 is equal to or greater than the change threshold value $\Delta Im\_th$.

As described above, the current flowing through the wiper motor 100 changes with change in the voltage applied to the wiper motor 100, and so the current ripple Ir and the amount of change $\Delta Im$ change. The current ripple Ir and the amount of change $\Delta Im$ also change with change in the temperature of the wiper motor 100. The current ripple Ir and the amount of change $\Delta Im$ also change with change in the torque of the wiper motor 100.

In response to these facts, the estimation unit 64 changes the change threshold value $\Delta Im\_th$ in accordance with the change in the voltage of the wiper motor 100 in S202. The estimation unit 64 also changes the change threshold value $\Delta Im\_th$ in accordance with the change in the temperature of the wiper motor 100 in S202. Furthermore, the estimation unit 64 changes the change threshold value $\Delta Im\_th$ in accordance with the change in the torque of the wiper motor 100 in S202.

This improves the calculation accuracy of the number of pulses N, which is calculated by comparing the amount of change $\Delta Im$ with the change threshold value $\Delta Im\_th$. This improves the accuracy of estimating the wiper angle $\theta w$.

The wiper control device 30 further includes the high current detection unit 39 and the high switching unit 41. The high current detection unit 39 detects the high current Im_Hi. The high switching unit 41 switches the detection range of the current detected by the high current detection unit 39. When the high current Im_Hi is equal to or greater than the high protection threshold Im_Hi_th, the high switching unit 41 makes the high current detection range larger than the detection range when the high current Im_Hi is less than the high protection threshold Im_Hi_th. Furthermore, when the high current Im_Hi is less than the high protection threshold Im_Hi_th, the high switching unit 41 makes the high current detection range smaller than the detection range when the high current Im_Hi is equal to or greater than the high protection threshold Im_Hi_th.

As a result, when the high current Im_Hi is equal to or greater than the high protection threshold Im_Hi_th, the high current detection unit 39 can detect a relatively large high current Im_Hi. Therefore, it is possible to detect abnormal heating of the high wire 37, the wiper motor 100, and the wiper 90 due to the relatively large high current Im_Hi. Furthermore, when the high current Im_Hi is less than the high protection threshold Im_Hi_th, the resolution is relatively high, so that the high current detection unit 39 can detect the high current Im_Hi with high accuracy. Therefore, the detection accuracy of the current ripple Ir is improved, and the calculation accuracy of the number of pulses N is improved. Therefore, the estimation accuracy of the wiper angle $\theta w$ is improved.

In addition, the wiper control device 30 further includes the low current detection unit 49 and the low switching unit 51. The low current detection unit 49 detects the low current Im_Lo. The low switching unit 51 switches the detection range of the current detected by the low current detection unit 49. Furthermore, when the low current Im_Lo is equal to or greater than the low protection threshold Im_Lo_th, the low switching unit 51 makes the low current detection range larger than the detection range when the low current Im_Lo is less than the low protection threshold Im_Lo_th. Furthermore, when the low current Im_Lo is less than the low protection threshold Im_Lo_th, the low switching unit 51 makes the low current detection range smaller than the detection range when the low current Im_Lo is equal to or greater than the low protection threshold Im_Lo_th.

As a result, when the low current Im_Lo is equal to or greater than the low protection threshold Im_Lo_th, the low current detection unit 49 can detect a relatively large low current Im_Lo. Therefore, abnormal heating of the low wire 47, the wiper motor 100, and the wiper 90 due to a relatively large low current Im_Lo can be detected. Furthermore, when the low current Im_Lo is less than the low protection threshold Im_Lo_th, the resolution is relatively high, so that the low current detection unit 49 can detect the low current Im_Lo with high accuracy. Therefore, the detection accuracy of the current ripple Ir is improved, and the calculation accuracy of the number of pulses N is improved. Therefore, the estimation accuracy of the wiper angle $\theta w$ is improved.

The drive unit 62 reduces the electric power supplied to the wiper motor 100 when the wiper position Pw is just before the lower return position Pd or when the wiper position Pw is just before the upper return position Pu.

As a result, the wiper 90 is decelerated just before the lower return position Pd or the upper return position Pu, so that the wiper 90 moves smoothly to the lower return position Pd or the upper return position Pu. This prevents the wiper 90 from overrunning, which is a state where the wiper 90 does not stop at the lower return position Pd or the upper return position Pu and goes past the lower return position Pd or the upper return position Pu. Therefore, operating noise of the wiper 90 generated when the wiper position Pw is the lower return position Pd or the upper return position Pu is reduced.

First Modification

In the above embodiment, the drive unit 62 performs the on/off control of the high switch 35 or the low switch 45 in S108. Accordingly, the drive unit 62 reduces the electric power supplied to the wiper motor 100. However, means for reducing the electric power supplied to the wiper motor 100 by the drive unit 62 is not limited to the on/off control. For example, the drive unit 62 may reduce the electric power supplied to the wiper motor 100 by controlling a DCDC converter (not shown) connected to the motor power supply 14 to step down the voltage applied from the motor power supply 14 to the wiper motor 100.

Figure 8:
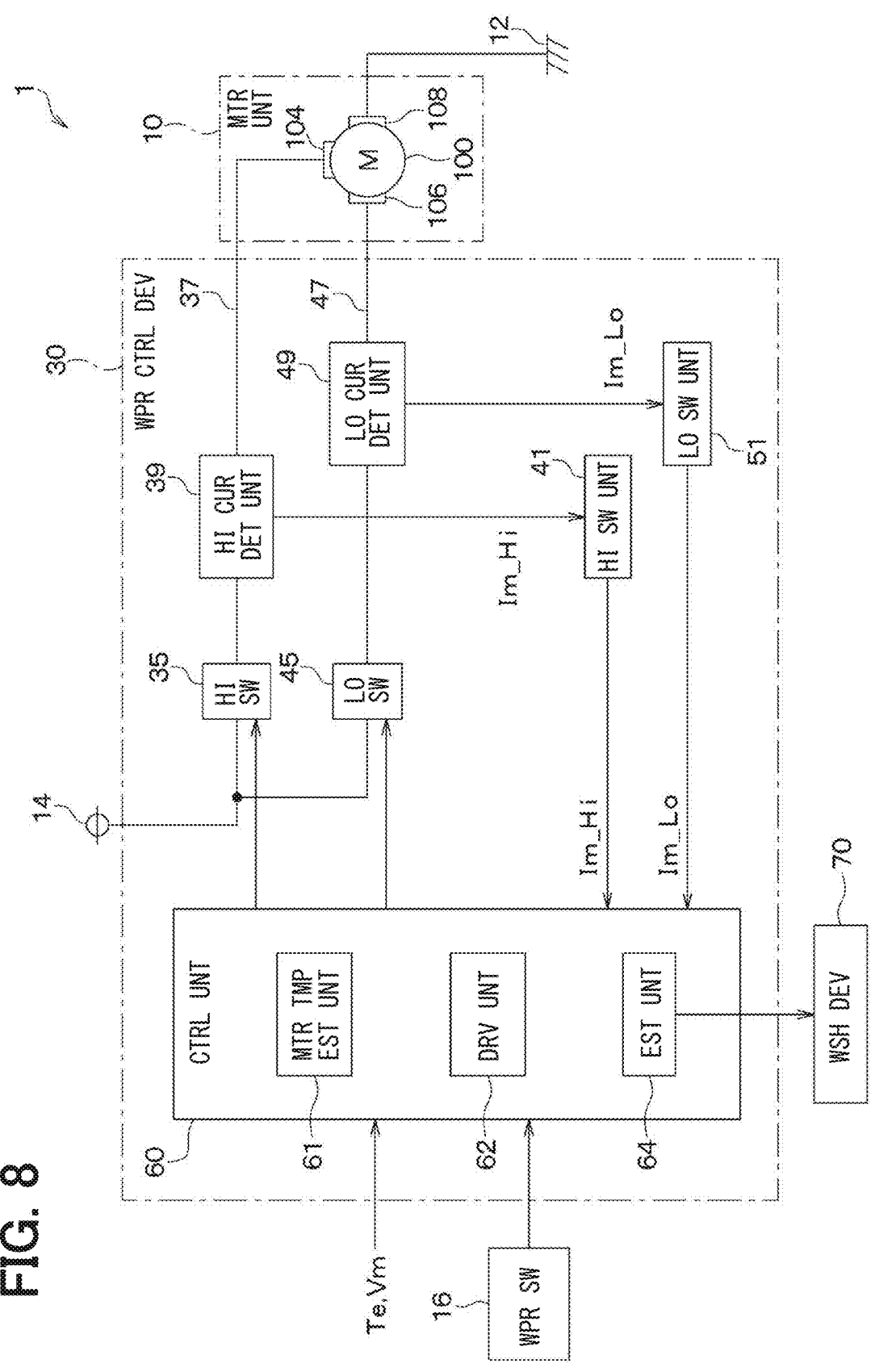
FIG. 8 is a configuration diagram of a wiper drive system including a wiper control device according to a first modification of the embodiment.

In the above embodiment, the estimation unit 64 may output a signal corresponding to the wiper angle θw estimated in S210 to an external device. For example, the external device is a washer device (WSH DEV) 70 as shown in FIG. 8. The washer device 70 controls a timing of ejecting washer fluid for cleaning a windshield (not shown) based on the signal from the estimation unit 64. For example, the washer device 70 ejects the washer fluid when the wiper angle θw estimated by the estimation unit 64 is zero or 2×θmax, that is, when the wiper position Pw is at the lower return position Pd.

Figure 9:
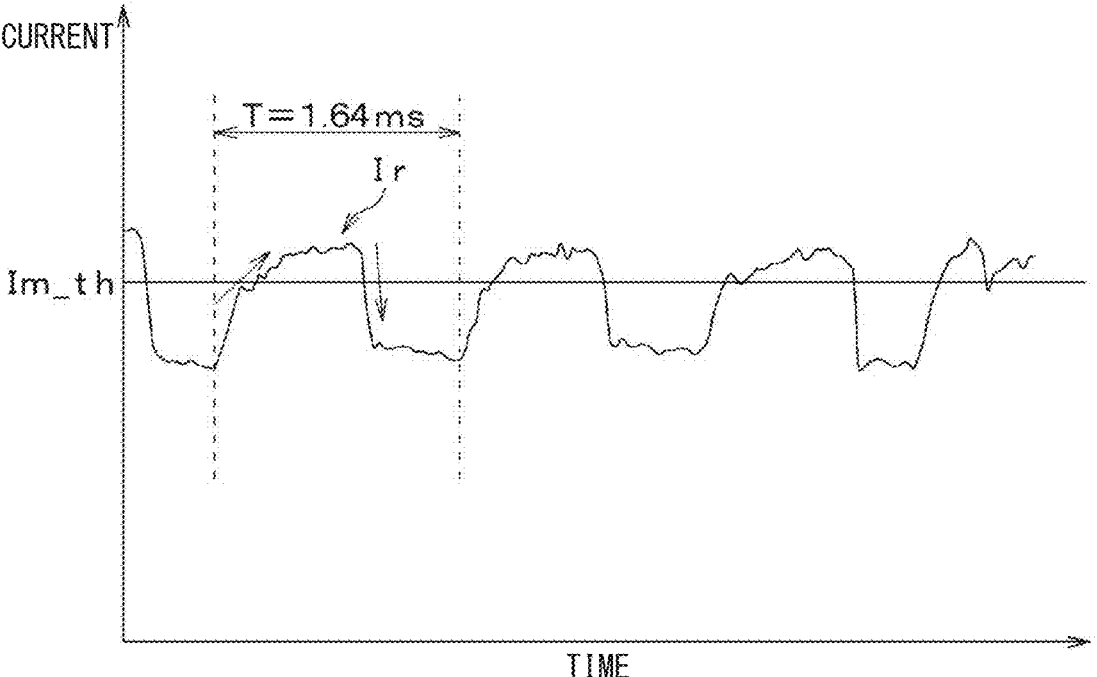
FIG. 9 is a diagram for explaining calculation of the number of pulses by an estimation unit in the wiper control device according to the first modification.

In the above embodiment, the estimation unit 64 calculates, as the pulse number N, the number of times when the amount of change ΔIm is equal to or greater than the change threshold value ΔIm_th. However, the number of pulses N is not limited to the number of times when the amount of change ΔIm is equal to or greater than the change threshold value ΔIm_th. For example, as shown in FIG. 9, the estimation unit 64 may calculate, as the pulse number N, the number of times that the current flowing through the wiper motor 100 changes from less than the current threshold Im_th to equal to or greater than the current threshold Im_th. The estimation unit 64 may also calculate, as the pulse number N, the number of times that the current flowing through the wiper motor 100 changes from being greater than the current threshold Im_th to being equal to or less than the current threshold Im_th. It should be noted that the current threshold Im_th is calculated, for example, based on the temperature of the wiper motor 100, the voltage applied to the wiper motor 100, and the torque of the wiper motor 100, similarly to the change threshold value ΔIm_th.

In the above embodiment, the high switching unit 41 switches the high current detection range between the first high detection range and the second high detection range based on the high current Im_Hi. However, the high switching unit 41 may switch the high current detection range to either the first high detection range or the second high detection range, regardless of the high current Im_Hi. For example, the high switching unit 41 may alternately switch the high current detection range between the first high detection range and the second high detection range over time. Similarly, the low switching unit 51 may switch the low current detection range between the first low detection range and the second low detection range, regardless of the low current Im_Lo. For example, the low switching unit 51 may alternately switch the low current detection range between the first low detection range and the second low detection range over time.

In the above embodiment, the high switch 35, the high current detection unit 39, the low switch 45, and the low current detection unit 49 are separate from each other. However, the high switch 35 and the high current detection unit 39 may be integrated. Furthermore, the low switch 45 and the low current detection unit 49 may be integrated. Moreover, the high switch 35, the high current detection unit 39, the low switch 45 and the low current detection unit 49 may be integrated.

Second Modification

In the above embodiment, the drive unit 62 performs PWM control on the wiper motor 100 by controlling the on/off state of the high switch 35 or the low switch 45 in S108. Accordingly, the wiper 90 can be restricted from overrunning without stopping at the lower return position Pd or the upper return position Pu.

Figure 10:
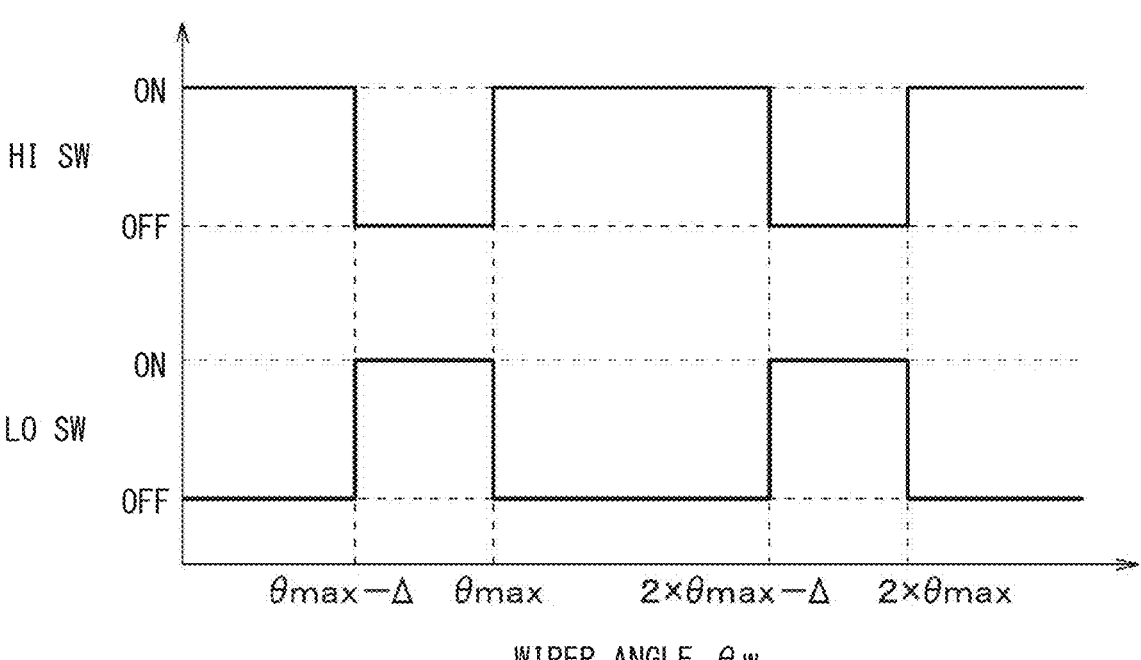
FIG. 10 is a diagram illustrating a relationship between a wiper angle and on/off states of a high switch and a low switch for explaining a process executed by a drive unit in a wiper control device according to a second modification of the embodiment.

The wiper motor 100 of a second modification is a permanent magnet field type direct current commutator motor. For example, the wiper motor 100 is a multi-speed motor in which a rotation of a motor can be switched between a low speed and a high speed by selectively switching between low speed brushes and high speed brushes to change a current supply circuit to an armature. Specifically, at least a pair of permanent magnets are fixed to an inner surface of a motor yoke (not shown), a winding is attached to the core of the armature, for example by lap winding, and the high terminal 104, the low terminal 106, and the ground terminal 108 serving as brushes are arranged on the commutator so as to be able to slide in contact with the commutator. Since the high terminal 104 is positioned at a more advanced angle than the low terminal 106, when the high terminal 104 is selected and the electric power is supplied, the motor rotation speed can be made faster than the rotation speed when the low terminal 106 is selected. In this manner, the wiper motor 100 of the second modification can be driven to rotate at a low or high speed by selectively switching between the high terminal 104 and the low terminal 106 to supply the electric power without PWM control. In the case where the wiper motor 100 of the second modification is used, when the high switch 35 is on and the wiper position Pw is just before the upper return position Pu, for example, the wiper angle θw is assumed to be θmax−Δ. At this time, the drive unit 62 changes the high switch 35 from on to off, as shown in FIG. 10. Accordingly, the drive unit 62 stops the power supply to the high terminal 104. At this time, the drive unit 62 also changes the low switch 45 from off to on. Accordingly, the drive unit 62 supplies the electric power to the low terminal 106. The rotation speed of the motor when the high terminal 104 is selected is higher than the rotation speed of the motor when the low terminal 106 is selected, and corresponds to a first speed. Furthermore, the rotation speed of the motor when the low terminal 106 is selected is lower than the rotation speed of the motor when the high terminal 104 is selected, and corresponds to a second speed.

When the wiper position Pw moves from just before the upper return position Pu to the upper return position Pu, in this case when the wiper angle θw changes from θmax−Δ to θmax, the drive unit 62 changes the high switch 35 from off to on. Accordingly, the drive unit 62 supplies the electric power to the high terminal 104. At this time, the drive unit 62 also changes the low switch 45 from on to off. Accordingly, the drive unit 62 stops the power supply to the low terminal 106.

In addition, when the high switch 35 is on and the wiper position Pw is just before the lower return position Pd, for example, the wiper angle θw is assumed to be 2×θmax−Δ. At this time, the drive unit 62 changes the high switch 35 from on to off. Accordingly, the drive unit 62 stops the power supply to the high terminal 104. At this time, the drive unit 62 also changes the low switch 45 from off to on. Accordingly, the drive unit 62 supplies the electric power to the low terminal 106.

Furthermore, when the wiper position Pw moves from just before the lower return position Pd to the lower return position Pd, in this case, when the wiper angle θw changes from 2×θmax−Δ to 2×θmax, the drive unit 62 changes the high switch 35 from off to on. Accordingly, the drive unit 62 supplies the electric power to the high terminal 104. At this time, the drive unit 62 also changes the low switch 45 from on to off. Accordingly, the drive unit 62 stops the power supply to the low terminal 106.

Even with the above-described process by the drive unit 62, the wiper 90 is decelerated just before the lower return position Pd or the upper return position Pu, so that the wiper 90 moves smoothly to the lower return position Pd or the upper return position Pu. As a result, overrun of the wiper 90 is restricted. In addition, operating noise of the wiper 90 generated when the wiper position Pw is the lower return position Pd or the upper return position Pu is reduced.

Figure 11:
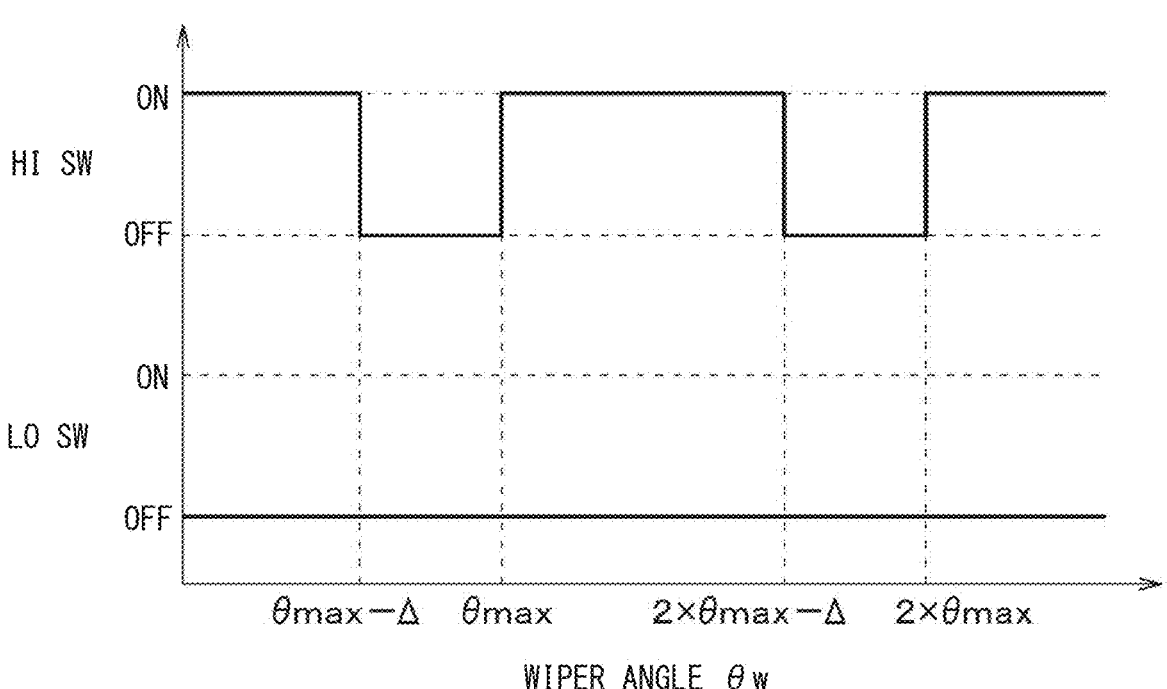
FIG. 11 is a diagram illustrating a relationship between the wiper angle and the on/off states of the high switch and the low switch for explaining another process executed by the drive unit in the wiper control device according to the second modification of the embodiment.

In the above-described process by the drive unit 62, the drive unit 62 turns the low switch 45 on and off. In another example, as shown in FIG. 11, when the wiper angle θw is equal to or greater than θmax−Δ and equal to or less than θmax, the drive unit 62 may keep the low switch 45 off rather than turning on the low switch 45. Furthermore, when the wiper angle θw is equal to or greater than 2×θmax−Δ and equal to or less than 2×θmax, the drive unit 62 may keep the low switch 45 off without turning on the low switch 45.

By the above-described process by the drive unit 62, the wiper 90 is decelerated just before the lower return position Pd or the upper return position Pu, so that the wiper 90 smoothly moves to the lower return position Pd or the upper return position Pu, in the same manner as described above. As a result, overrun and operating noise of the wiper 90 are restricted.

In the above-described second modification, the high terminal 104 corresponds to a first terminal to which an electric power is supplied, and the low terminal 106 corresponds to a second terminal to which an electric power smaller than the electric power supplied to the first terminal is supplied. The high switch 35 corresponds to a first element that, when turned on, causes a current to flow to the wiper motor via the first terminal so as to rotate the wiper motor. The low switch 45 corresponds to a second element that, when turned on, causes a current to flow to the wiper motor via the second terminal so as to rotate the wiper motor.

A wiper device according to another comparative example controls a drive means so that an angular velocity and an angular acceleration of a wiper rotation shaft at a return position of a wiper arm become zero.

This wiper device requires a sensor for detecting the angular velocity and angular acceleration of the wiper rotating shaft. Thus, the number of parts in the wiper device increases, and the cost of the wiper device increases.

On the other hand, in the above-described embodiment, the first modification and the second modification, the overrun and operating noise of the wiper 90 are restricted without using a sensor for detecting the angular velocity and angular acceleration of the wiper 90. Therefore, in the above-described embodiment, the first modification and the second modification, an increase in the number of parts of the wiper control device 30 is restricted. Thus, an increase in the cost of the wiper control device 30 can be restricted while restricting overrun and operating noise of the wiper 90.

Other Embodiments

The present disclosure is not limited to the above-described embodiments, and the above-described embodiments can be appropriately modified. The constituent element(s) of each of the above embodiments is/are not necessarily essential unless it is specifically stated that the constituent element(s) is/are essential in the above embodiment, or unless the constituent element(s) is/are obviously essential in principle.

The acquisition unit, the estimation unit, the drive unit, and the methods thereof described in the present disclosure may be realized by a dedicated computer provided by configuring a processor, programmed to execute one or more functions embodied by a computer program, and a memory. Alternatively, the acquisition unit, the estimation unit, the drive unit, and the methods thereof described in the present disclosure may be realized by a dedicated computer provided by configuring a processor with one or more dedicated hardware logic circuits. Alternatively, the acquisition unit, the estimation unit, the drive unit, and the methods thereof described in the present disclosure may be realized by one or more dedicated computers configured by a combination of a processor programmed to execute one or more functions, a memory, and a processor configured by one or more hardware logic circuits. The computer program may be stored, as instructions to be executed by a computer, in a tangible non-transitory computer-readable medium.

The above-described embodiment and each of the above-described modifications may be combined as appropriate.

What is claimed is:

1. A wiper control device comprising:

an acquisition unit configured to acquire a value related to a current flowing through a wiper motor that drives a wiper configured to reciprocate between a first position and a second position; and an estimation unit configured to estimate a wiper angle, which is a rotation angle of the wiper, based on a current ripple in the current flowing through the wiper motor, the current ripple having a periodicity corresponding to driving of the wiper motor, wherein the estimation unit is configured to estimate the wiper angle based on a number of times that an absolute value of an amount of change in the current flowing through the wiper motor becomes equal to or greater than a threshold value.

2. The wiper control device according to claim 1, wherein the estimation unit is configured to change the threshold value in accordance with a change in a voltage of the wiper motor.

3. The wiper control device according to claim 1, wherein the estimation unit is configured to change the threshold value in accordance with a change in a temperature of the wiper motor.

4. The wiper control device according to claim 1, wherein the estimation unit is configured to change the threshold value in accordance with a change in a torque of the wiper motor.

5. The wiper control device according to claim 1, further comprising:

a current detection unit configured to detect the current flowing through the wiper motor; and a switching unit configured to switch a detection range of the current detected by the current detection unit, wherein the switching unit is configured to switch the detection range in such a manner that the detection range when the current flowing through the wiper motor is equal to or greater than a protection threshold value is larger than the detection range when the current flowing through the wiper motor is less than the protection threshold value.

6. The wiper control device according to claim 1, further comprising:

a current detection unit configured to detect the current flowing through the wiper motor; and a switching unit configured to switch a detection range of the current detected by the current detection unit, wherein the switching unit is configured to switch the detection range between a first detection range and a second detection range over time, and the second detection range is smaller than the first detection range.

7. A wiper control device comprising:

an acquisition unit configured to acquire a value related to a current flowing through a wiper motor that drives a wiper configured to reciprocate between a first position and a second position; and an estimation unit configured to estimate a wiper angle, which is a rotation angle of the wiper, based on a current ripple in the current flowing through the wiper motor, the current ripple having a periodicity corresponding to driving of the wiper motor, wherein the estimation unit is configured to estimate the wiper angle based on a number of times that the current flowing through the wiper motor changes from being less than a threshold value to being equal to or greater than the threshold value.

8. The wiper control device according to claim 7, wherein the estimation unit is configured to change the threshold value in accordance with a change in a voltage of the wiper motor.

9. The wiper control device according to claim 7, wherein the estimation unit is configured to change the threshold value in accordance with a change in a temperature of the wiper motor.

10. The wiper control device according to claim 7, wherein the estimation unit is configured to change the threshold value in accordance with a change in a torque of the wiper motor.

11. The wiper control device according to claim 7, further comprising:

a current detection unit configured to detect the current flowing through the wiper motor; and a switching unit configured to switch a detection range of the current detected by the current detection unit, wherein the switching unit is configured to switch the detection range in such a manner that the detection range when the current flowing through the wiper motor is equal to or greater than a protection threshold value is larger than the detection range when the current flowing through the wiper motor is less than the protection threshold value.

12. The wiper control device according to claim 7, further comprising:

a current detection unit configured to detect the current flowing through the wiper motor; and a switching unit configured to switch a detection range of the current detected by the current detection unit, wherein the switching unit is configured to switch the detection range between a first detection range and a second detection range over time, and the second detection range is smaller than the first detection range.

13. A wiper control device comprising:

an acquisition unit configured to acquire a value related to a current flowing through a wiper motor that drives a wiper configured to reciprocate between a first position and a second position; and an estimation unit configured to estimate a wiper angle, which is a rotation angle of the wiper, based on a current ripple in the current flowing through the wiper motor, the current ripple having a periodicity corresponding to driving of the wiper motor, wherein the estimation unit is configured to estimate the wiper angle based on a number of times that the current flowing through the wiper motor changes from being greater than a threshold value to being equal to or less than the threshold value.

14. The wiper control device according to claim 13, wherein the estimation unit is configured to change the threshold value in accordance with a change in a voltage of the wiper motor.

15. The wiper control device according to claim 13, wherein the estimation unit is configured to change the threshold value in accordance with a change in a temperature of the wiper motor.

16. The wiper control device according to claim 13, wherein the estimation unit is configured to change the threshold value in accordance with a change in a torque of the wiper motor.

17. The wiper control device according to claim 13, further comprising:

a current detection unit configured to detect the current flowing through the wiper motor; and a switching unit configured to switch a detection range of the current detected by the current detection unit, wherein the switching unit is configured to switch the detection range in such a manner that the detection range when the current flowing through the wiper motor is equal to or greater than a protection threshold value is larger than the detection range when the current flowing through the wiper motor is less than the protection threshold value.

18. The wiper control device according to claim 13, further comprising:

a current detection unit configured to detect the current flowing through the wiper motor; and a switching unit configured to switch a detection range of the current detected by the current detection unit, wherein the switching unit is configured to switch the detection range between a first detection range and a second detection range over time, and the second detection range is smaller than the first detection range.

\* \* \* \* \*